(12) United States Patent
Raymond et al.

(10) Patent No.: US 7,946,286 B2
(45) Date of Patent: May 24, 2011

(54) TRACKING FIBER OPTIC WAFER CONCENTRATOR

(75) Inventors: Mark A. Raymond, Littleton, CO (US); Howard G. Lange, Mount Prospect, IL (US); Seth Weiss, Cherry Hills Village, CO (US)

(73) Assignee: Genie Lens Technologies, LLC, Englewood, CO (US)

( * ) Notice: Subject to any disclaimer, the term of this patent is extended or adjusted under 35 U.S.C. 154(b) by 0 days.

(21) Appl. No.: 12/888,584

(22) Filed: Sep. 23, 2010

(65) Prior Publication Data
US 2011/0067687 A1    Mar. 24, 2011

Related U.S. Application Data

(60) Provisional application No. 61/245,507, filed on Sep. 24, 2009.

(51) Int. Cl.
    *F24J 2/24* (2006.01)
(52) U.S. Cl. ......... 126/678; 126/698; 126/700; 126/569
(58) Field of Classification Search ................... 126/678, 126/698, 700
    See application file for complete search history.

(56) References Cited

U.S. PATENT DOCUMENTS

| | | | | |
|---|---|---|---|---|
| 3,578,972 A | * | 5/1971 | Dooley et al. | 250/462.1 |
| 3,780,722 A | * | 12/1973 | Swet | 126/680 |
| 4,055,948 A | * | 11/1977 | Kraus et al. | 60/641.8 |
| 4,188,941 A | * | 2/1980 | Hopkins | 126/646 |
| 4,201,197 A | * | 5/1980 | Dismer | 126/600 |
| 4,257,401 A | * | 3/1981 | Daniels | 126/602 |
| 4,275,950 A | * | 6/1981 | Meyer | 126/698 |
| 4,282,858 A | * | 8/1981 | Bowers, Jr. | 126/574 |
| 4,287,881 A | * | 9/1981 | Palazzetti et al. | 126/658 |
| 4,297,000 A | * | 10/1981 | Fries | 362/557 |
| 4,307,936 A | * | 12/1981 | Ochiai | 385/120 |
| 4,389,085 A | * | 6/1983 | Mori | 359/591 |
| 4,425,905 A | * | 1/1984 | Mori | 126/578 |
| 4,433,199 A | * | 2/1984 | Middy | 136/246 |
| 4,458,672 A | * | 7/1984 | Wesley | 126/606 |
| RE31,678 E | * | 9/1984 | Ochiai | 385/115 |
| 4,483,311 A | * | 11/1984 | Whitaker | 126/602 |

(Continued)

FOREIGN PATENT DOCUMENTS

SU    1015197 A  * 4/1983

*Primary Examiner* — Kenneth B Rinehart
*Assistant Examiner* — Jorge Pereiro
(74) *Attorney, Agent, or Firm* — Marsh Fischmann & Breyfogle LLP; Kent A. Lembke

(57) ABSTRACT

A solar power system for supplying concentrated solar energy. The system includes a cylindrical absorber tube carrying the working fluid and a concentrator assembly, which includes an array of linear lenses such as Fresnel lenses. The concentrator assembly includes a planar optical wafer paired with each of the linear lenses to direct light, which the lenses focus on a first edge of the wafers, onto the collector via a second or output edge of the wafers. Each of the optical wafers is formed from a light transmissive material and acts as a light "pipe." The lens array is spaced apart a distance from the first edges of the optical wafers. This distance or lens array height is periodically adjusted to account for seasonal changes in the Sun's position, such that the focal point of each linear lens remains upon the first edge of one of the optical wafers yearlong.

18 Claims, 9 Drawing Sheets

U.S. PATENT DOCUMENTS

| | | | |
|---|---|---|---|
| 4,566,433 A * | 1/1986 | Amundsen | 126/652 |
| 4,588,151 A * | 5/1986 | Mori | 244/172.6 |
| 4,653,472 A * | 3/1987 | Mori | 126/683 |
| 4,723,826 A * | 2/1988 | Whitaker | 126/576 |
| 4,766,884 A * | 8/1988 | Mori | 126/591 |
| 4,798,444 A * | 1/1989 | McLean | 385/76 |
| 4,982,723 A * | 1/1991 | Mori | 126/591 |
| 5,501,743 A * | 3/1996 | Cherney | 136/248 |
| 5,575,860 A * | 11/1996 | Cherney | 136/245 |
| 5,802,784 A * | 9/1998 | Federmann | 52/204.5 |
| 6,037,535 A * | 3/2000 | Yoshino | 136/246 |
| 6,730,840 B2 * | 5/2004 | Sasaoka et al. | 136/246 |
| 6,895,145 B2 * | 5/2005 | Ho | 385/35 |
| 6,899,097 B1 * | 5/2005 | Mecham | 126/591 |
| 7,102,824 B2 * | 9/2006 | Clark et al. | 359/571 |
| 7,281,381 B2 * | 10/2007 | Johnson | 60/641.15 |
| 7,345,320 B2 * | 3/2008 | Dahm | 257/99 |
| 7,558,452 B2 * | 7/2009 | Ho | 385/35 |
| 7,873,257 B2 * | 1/2011 | Morgan | 385/146 |
| 2002/0112719 A1 * | 8/2002 | Yogev | 126/639 |
| 2005/0039791 A1 * | 2/2005 | Johnson | 136/259 |
| 2006/0010867 A1 * | 1/2006 | Shaw | 60/641.8 |
| 2008/0078435 A1 * | 4/2008 | Johnson | 136/206 |
| 2009/0032102 A1 * | 2/2009 | Chen et al. | 136/259 |
| 2009/0059966 A1 * | 3/2009 | Mayer et al. | 372/6 |
| 2009/0159078 A1 * | 6/2009 | Penciu | 126/704 |
| 2010/0024805 A1 * | 2/2010 | Raymond et al. | 126/683 |
| 2010/0116319 A1 * | 5/2010 | Martinez Anton et al. | 136/246 |
| 2010/0116336 A1 * | 5/2010 | Martinez Anton et al. | 136/259 |
| 2010/0212719 A1 * | 8/2010 | Stolum | 136/246 |
| 2010/0229854 A1 * | 9/2010 | Martin-Lopez | 126/698 |
| 2010/0269817 A1 * | 10/2010 | Kelly | 126/698 |
| 2010/0319680 A1 * | 12/2010 | Kelly | 126/601 |

* cited by examiner

TRACKING FIBER OPTIC WAFER CONCENTRATOR

CROSS-REFERENCE TO RELATED APPLICATIONS

This application claims the benefit of U.S. Provisional Application No. 61/245,507 filed Sep. 24, 2009, which is incorporated herein by reference in its entirety.

BACKGROUND OF THE INVENTION

1. Field of the Invention

The present invention relates, in general, to concentrators for use in the solar power industry, and, more particularly, to systems, devices and methods for more effectively concentrating solar energy (or, more simply, for concentrating sunlight) using an improved tracking concentrator such as a fiber optic wafer concentrator adapted for effective tracking of the Sun.

2. Relevant Background

In general, concentrated solar power systems use lenses or mirrors to focus a large area of sunlight onto a small area. Electrical power is produced when the concentrated light is directed onto photovoltaic surfaces or when the concentrated light is used to heat a transfer fluid for a conventional power plant (e.g., to run a turbine with steam).

With regard to the latter example, thermal concentrators have been around for many years, with concentrated solar thermal (CST) being used to produce renewable heat or electricity (which may be labeled thermoelectricity as it is usually generated via steam generation). A wide range of concentrating technologies exists with a parabolic trough being a popular choice for use in many CST systems. A parabolic trough includes a linear parabolic reflector that concentrates light onto a receiver that is positioned along the reflector's focal line. The receiver is typically a pipe or tube (i.e., is an absorber tube) positioned directly above the middle of the parabolic reflector (or mirrored surface that may be a coating of silver, polished aluminum, or the like). The pipe or tube is filled with a working or transfer fluid. The reflector is operated to attempt to accurately track the Sun's movements during daylight hours by tracking along a single axis. In some cases, the working fluid is an oil, a molten salt, or other material that is heated to high temperatures (300 to 700° F.) as it flows through the receiver, and fluid is then used as a heat source for a power generation system (e.g., to heat water to create steam that is used to turn a turbine generator or the like).

There is a strong desire to expand the use of renewable energy sources such as thermal concentrators. As discussed above, CST systems generally track the Sun east to west from the morning to evening hours, and this is done with a complex tracking system that tilts a linear parabolic concentrator or reflector, which may be may several hundred meters long and up to as much as ten or meters across. Generally, the lines or solar filed piping/absorber tubing of these systems are linked together to heat water and in turn generate steam to drive a turbine generator to provide electricity. The parabolic concentrators are generally made of glass with a mirror backing material and include a sturdy framing system that is positioned or controlled with a computerized one axis tracking system. The parabolic concentrators are generally focused to heat an absorber tube made of tempered glass and containing water, oil, or the like that is pumped through the tube (which is generally 5 to 10-inches in diameter) at the correct rate depending upon the length of the concentrator and corresponding to the overall size of the system.

While being desirable for using a renewable power source, CST systems, such as those that utilize parabolic concentrators with single-axis tracking capabilities, have not been widely adopted. One drawback with CST systems is that they tend to be quite inefficient, and this lack of efficiency is especially acute during months where the incidence angle of the sun is the furthest from perpendicular. Collecting efficiencies due to the skewed focus of the troughs can drop to under fifty percent in these conditions. In addition, the absorber tube or pipe carrying the heated fluid may be relatively large in diameter and is located directly in front of the concentrator (i.e., in the trough of the parabolic reflector or the like), which shadows the overall collection device and decreases efficiency further. Efficiencies of CST systems are a concern as the overall efficiencies from collector to grid may be as low as about fifteen percent. Hence, there is a need to enhance efficiencies at each step of the process including collection and thermal efficiencies proximate or within the collector assembly.

Additional drawbacks of conventional parabolic concentrators include expense of manufacturing, lack of efficiency during many months of the year (e.g., due to non ideal azimuth angles), and fragility of the parabolic trough materials (e.g., which may lead to damage under normal operating conditions such as due to weather conditions including hail, strong winds, and the like). In addition, parabolic reflectors or concentrators tend to be quite dangerous to work around during sunlight hours as they produce concentrated beams of sunlight that can cause severe burns and even blindness and as many of the parts of the system are at very high operating temperatures.

Further, one of the larger drawbacks is the need to maintain the reflector and absorber tubing outer surfaces in a very clean state to maintain light collection and thermal efficiencies in desired ranges. As a result, a problem with parabolic concentrators is the difficulty of cleaning the systems including the large usage of cleaning chemicals and water. Large systems require constant cleaning and rinsing, adding costs and, over time, contaminating soil underneath the reflectors. In desert conditions where many CST systems are located, it is particularly expensive and difficult to provide water for cleaning these units. Most arrays are cleaned by crews on an ongoing basis or seven days a week, which increases the maintenance or operating costs associated with generation of electricity with CST systems.

Hence, there remains a need for a more modern, scalable concentrator system. Preferably, such a concentrator system would be easier to clean including using less water and chemicals. The system may be cheaper to manufacture and less dangerous to operate and maintain (and more durable such as being less likely to be damaged by hail or the like). Further, the concentrator system may be more efficient (with a lower cost per watt of generated electricity). Still further, the concentrator system may be useful for heating a variety of transfer or working fluids including heating oil, glycol, air, or other liquids and also have the ability to function as a photovoltaic concentrator at the same time or independently from heating a working or transfer fluid.

SUMMARY OF THE INVENTION

The present invention addresses the above and other problems by providing a concentrator for a solar energy system (e.g., a concentrated solar power (CSP) system) such as a scalable, linear Fresnel collector system or assembly that uses fiber optic wafers or pipes. It is believed such as a concentrator will cost significantly less than conventional parabolic trough collectors while providing efficiencies of fifty percent or, more likely, higher efficiencies.

Concentrators for use with solar technologies, including concentrated solar power (CSP) systems, are becoming increasingly efficient and are being used primarily for concentrating sunlight to create heat for generating electricity. CSP systems producing electricity using heat (rather than photovoltaic (PV) surfaces) typically are configured to generate heat sufficient to create steam, which, in turn, is used to drive a turbine or sterling engine to generate electricity. Most concentrators, such as parabolic trough concentrators, provide limited efficiencies, have high associated manufacturing and maintenance costs, and utilize mirrors rather than lenses to concentrate sunlight. In the majority of these CSP systems, the collector or receiver (or absorber tube) is located in front of the mirrored surfaces of the reflector and causes shadowing, which leads to decreased efficiencies. High quality mirrors or reflectors are also very expensive to manufacture and require a great deal of maintenance (e.g., cleaning) to maintain their reflectivity. Most of the existing CSP technologies utilize trough or dish technologies, and both of these collector technologies have marginal efficiencies and present problems for collecting thermal energy from the Sun over differing seasons and even during a single day's time.

Traditional trough collectors may have several sunlight or ray "bounces" before the rays hit the linear collector or absorber tube. The trough may be fixed in place but, more typically, a tracking system or assembly is provided to move the large trough to better track the changing position of the Sun and direct a larger percentage of received sunlight onto the linear collector or absorber tube. Generally, trough collectors use a single-axis tracking system to modify or adjust orientation of the trough in the east to west direction (e.g., attempt to follow the Sun's movement across the sky in daylight hours). Parabolic trough collectors may have maximum ray collection efficiencies (which may also be measured as thermal efficiencies) of about 60 to 80 percent with net efficiencies of about fifty percent or less after reflectivity deductions, shadowing and off azimuth angle averages during the year are fully considered. A further concern is that the trough designs often have to be limited to a particular size and particular concentration ratios.

Due, in part, to these limits associated with parabolic trough collectors, other collectors have been designed and implemented in CSP systems but with limited success. For example, dish collectors have been used in CSP systems. Dish collectors provide two axes of tracking that provide an advantage over the single-axis tracking of trough systems as it allows adjustments to be more readily made for seasonal changes in the Sun's location. However, dish collectors present scaling and other problems. The mirrors for the dish-shaped reflector or collector are difficult to build economically. Also, there is presently not a practical solution for linking more than one unit together such as to facilitate the creation of steam to run turbines or other power generation devices in scale for conventional or thermal storage power plants.

In other CSP systems, desert towers are used to create a great deal of heat by using mirrors positioned around a tower to focus toward the tower. Unfortunately, these systems are very expensive to fabricate and maintain as well as being relatively dangerous to operate. Further, tower-based CSP systems require a great deal of land (e.g., have a large footprint or land-use profile) and require significant amounts and nearly continuous maintenance to continue to operate near or in design efficiency ranges.

In some cases, Fresnel lenses have shown promise for use in concentrators. The use of lenses have led to scaling problems, though, as concentration ratios in linear collectors are limited (e.g., 300 to 1), and larger lenses (including Fresnel lenses) have extremely long focal lengths that are difficult to manage or manipulate with conventional tracking as found in parabolic trough collectors. For example, some of larger Fresnel lenses may have focal lengths of 40 feet or more and are assembled in pieces. To get the power to one spot location, such large Fresnel lenses may have to be mounted high in the sky to focus on a "spot" location, and, in the past, there had been no way to consolidate the heat with adjoining lens arrays. Since parabolic troughs cannot reach ideal temperatures for making steam (e.g., ideally, temperatures in excess of 1000° F.) and towers do not integrate well into existing coal or natural gas plants, there has not been an ideal concentrator available within the solar energy industry.

The inventors recognized the need for a new type of collector or "concentrator" that may be used for thermal power generation, in thermal PV systems, and concentrator PV systems. To this end, the inventors propose a concentrator for a solar energy system (e.g., a concentrated solar power (CSP) system) such as a scalable, linear Fresnel collector system or assembly that uses fiber optic wafers or pipes. The concentrator may be thought of as a tracking, integrated lens and optical wafer concentrator (or a Fresnel lens-based tracking concentrator utilizing fiber optic wafers or pipes). The described concentrator (and CSP systems including such a concentrator) solves economic issues, scalability issues, temperature issues, and other issues associated with prior solar collector technologies while allowing easy integration of the concentrator into gas plants and coal plants.

More particularly, a solar power system is provided for supplying concentrated solar energy, such as via a working or transfer fluid or via PV materials or devices, to a power generator or thermal storage. The system includes a collector and a concentrator assembly. The concentrator assembly includes an array of two or more linear lenses (such as planar or arched linear Fresnel lenses with a width of 4 to 10 inches or more and a length extending along the concentrator). The concentrator assembly also includes a set of optical wafers each having a planar body and each being paired with one of the linear lenses to direct light focused by the corresponding lenses onto the collector. Specifically, a first edge of the body of the optical wafers is supported in the concentrator assembly to be proximate to the array of linear lenses (e.g., supported by a support plate with a linear edge facing toward one of the lenses). Additionally, a second edge of the body of the optical wafers (opposite the first edge) is positioned proximate to the collector, and each of the linear lenses focuses received sunlight onto the first edge of the paired one of the optical wafers. In this manner, a portion of the sunlight focused by each lens on an edge of the optical wafer is transmitted through the optical wafers to the collector (and out the second edges of the wafers that act as light pipes for the concentrated sunlight or solar energy).

In some embodiments, each of the bodies of the optical wafers is formed from a light transmissive material (such as a plastic, glass, or ceramic), and the focused sunlight that enters the body at the first edge is retained within the body using total internal reflection. The lens array may be spaced apart from the first edges of the bodies of the optical wafers by a lens array height, and this lens array height is selected based on a configuration of the linear lenses such that a focal point for each of the linear lenses is proximate to one of the first edges along a length of the concentrator assembly (e.g., light for each lens is focused along a line that coincides with the first edge of a paired/corresponding light wafer). Significantly, the lens array is positionable within the concentrator assembly to adjust the lens array height such that the focal points of the linear lenses substantially coincide with one of the first edges of the optical wafers to cause the focused sunlight to enter the optical wafers. For example, the concentrator assembly may include an array positioning mechanism or assembly adapted to provide two-axis tracking of the lens array including tracking a position of the Sun during daytime hours and periodically adjusting the lens array height based on the Sun's azimuth to match a focal length of the linear lenses to the array height.

In some embodiments, each of the linear lenses is substantially identical in configuration and is a linear Fresnel lens. More particularly, the system may have an array of lenses including at least eight of linear Fresnel lenses (e.g., arched Fresnel lenses with the flat side facing outward to facilitate cleaning). In some cases, the collector includes an absorber tube or pipe with a light-transmissive sidewall (e.g., glass, plastic, or ceramic material cylindrical sidewall) through which a volume of working fluid flows during operation of the solar power system. Then, the second edge of each of the bodies of the optical wafer is positioned about a circumference of the sidewall to target the portion of the focused sunlight into the working fluid (e.g., eight to twelve or more planar wafers may be positioned equidistally about the circumference of the absorber tube to target the flowing working fluid from eight differing angles to more readily/equally heat the working/transfer fluid).

In some embodiments, the concentrator assembly further includes a sleeve extending along the length of the absorber tube and spaced apart a distance from an outer surface of the absorber tube. The sleeve rotates about the absorber tube when the position of the lens array is adjusted to track a position of the Sun. The gap may be air filled or filled with a second fluid such as one that has excellent heat transfer qualities to pass heat from the shell/sleeve to the absorber tube if the shell/sleeve is a heat conducting material rather than a light transmissive material.

DETAILED DESCRIPTION OF THE PREFERRED EMBODIMENTS

Figure 1:
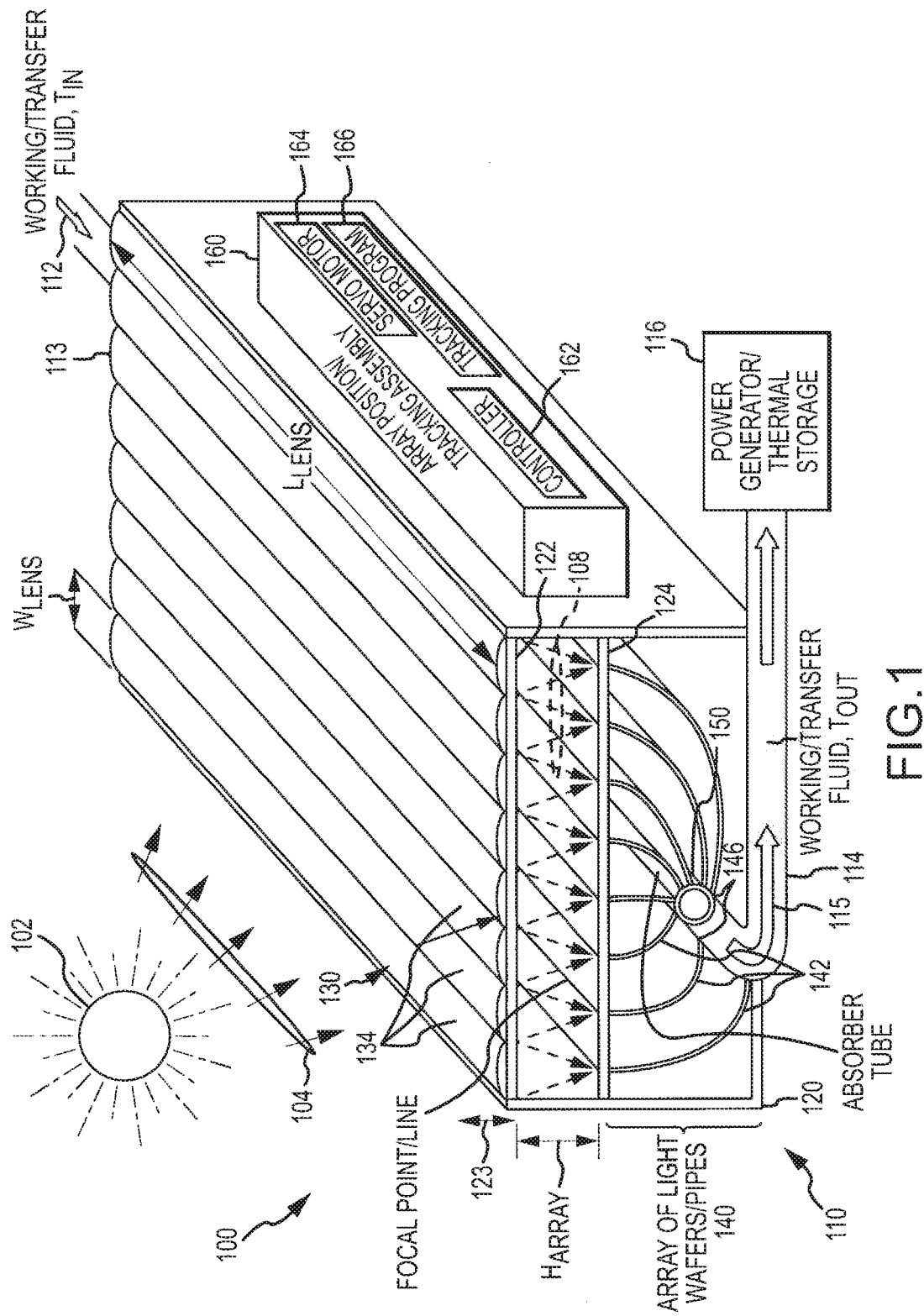
FIG. 1 shows a functional schematic view of an embodiment of a concentrated solar power (CSP) systems of the present invention showing the combination of an adjustable position (or height) lens array with an array of optical or light wafers/pipes to concentrate sunlight onto a receiving surface (e.g., PV material or the like with an absorber tube carrying working/transfer fluid being shown)

The present invention is generally directed toward new concentrators or collectors for more effectively collecting solar energy throughout the day and over two or more seasons. FIG. 1 illustrates schematically (or in functional block form) a concentrated solar power (CSP) system 100 of one embodiment. As shown, the CSP system 100 includes a concentrator or collector assembly 110 that combines a lens array with a set or array of light wafers, and the concentrator assembly 110 may be tracking and/or have the lens array be adjustable to adjust for daily and/or seasonal changes in the position of the Sun 102.

Briefly, the CSP system 100 includes the concentrator assembly 110 that includes a housing 120 in which a lens frame or support 122 is provided near an upper opening. The housing 120 also includes a wafer support or plate 124 that is typically rigidly mounted in the housing 120 and supports a first or receiving end 144 of a plurality of light wafers or pipes 142 (e.g., a set of focal points or lines are presented on an upper surface of plate 124). Significantly, the concentrator assembly 110 also includes a lens array 130 made up of a plurality of linear lenses 134 (e.g., linear Fresnel lenses or the like) each with a width, $W_{Lens}$, and a length, $L_{Lens}$ (e.g., with a length, $L_{Lens}$, that is much greater than the width, $W_{Lens}$). The elongated (and generally planar) lenses 134 are supported in the frame 122 with an upper or receiving surface facing outward from housing 120.

As shown, the concentrator assembly 110 is positioned to receive solar energy or sunlight from the Sun 102. The lenses 134 of the lens array 130 are arranged to focus light 108 onto first ends/edges 144 of an array 140 of light wafer or pipes 142. To this end, the array 130 may be moved 123 to change its relative distance or height, $H_{Array}$, from the supporting plate 124 and receiving or first edges 144 of wafers 142. In some preferred embodiments, the distance, $H_{Array}$, is chosen and the lenses 134 are configured to focus on the focal point/line coinciding with the edges 144 of wafers 142. The wafers 142 are typically sheets of plastic or the like configured to trap and transport, without significant losses, the light 108 from the first end/edge 144 to the second or outlet end/edge 146, which is abutting an a receiver or absorber tube 150.

The concentrator 110 further includes an array position and tracking assembly 160 that is adapted to alter the position of the lens array 130 to track the position of the Sun 102 relative to the light receiving surface of the lenses 134. For example, the assembly 160 may include a controller (e.g., an electronic or computer device with a processor running one or more sets of code to perform particular functions) 162 that selectively issues control signals to a servo motor or similar device 164 to pivot the array 130 on an axis to provide intraday tracking.

Further, the servo motor 164 preferably is able to set and change 123 the distance or height, $H_{Array}$, above the plate 124 and receiving edges 144 such that the lenses 134 focus the light 108 generally into the wafers 142. The adjustment of the separating distance, HArray, between the lenses 134 and the receiving edges 144 is a significant aspect of the invention and is discussed in detail below, and this feature is provided to adjust the array 134 to account for seasonal changes in the position of the Sun 102 (e.g., the angle of received sunlight 104 that changes over the course of a year). The operation of the controller 162 may include running one or more tracking programs 166 that may define height, $H_{Array}$, such as based on a calendar and geographical location of the concentrator 110, and that may provide input for daily tracking operations for concentrator 110.

The light 108 then travels within the wafers 142 to be output at ends/edges 146 into the tube 150. A working or transfer fluid 113 is fed into the tube 150 at an inlet 112 to the concentrator 110 at a first, lower temperature, $T_{In}$. Along the length of the absorber tube 150 between the inlet 112 and outlet 114, the fluid is heated by focused/concentrated (and combined) light 108 so that the fluid 115 is output at the outlet 114 at a second, much higher temperate, $T_{Out}$. The tube 150 may be formed with substantially transparent sidewalls (of glass, plastic, or ceramic materials) and support the ends 146 to direct the light 108 through the sidewalls. The heated fluid 115 may then be transferred to a power generator or thermal storage 116 where the collected solar energy may be utilized such as by creating steam to drive a conventional steam generator, to heat materials for thermal storage, and so on as is well known in the power industry. One concentrator 110 is shown in CSP system 100 but, of course, a typical CPS system 100 will include a much larger number of such concentrators 110 providing a system or field of solar piping 114 that would be combined at inlet and outlet manifolds to the power generator/thermal storage 116.

In one embodiment, the lenses 134 are linear Fresnel lenses. Such linear Fresnel lenses 134 may be curved or flat and made of a variety of transparent materials (or at least translucent to substantially transparent materials) such as a glass, a plastic, a ceramic, or a combination thereof. Linear Fresnel lenses 134 may be extruded at high rates of speed and may be up to 8 feet or more wide, $W_{Lens}$, and nearly infinitely long, $L_{Lens}$, (with 20 to 50 feet or more in length being common for many arrays 130). The lenses 134 are assembled in frame(s) 122 and mounted next to each other (width wise) to provide each array 130. Several lenses 134 may be mounted across the frame 122 to provide an array 130 having a width of 50 feet or more. Focal lengths of the lenses are usually around 1.5 times their width, $W_{Lens}$, but this may vary depending upon the lens design. In some cases of concentrator 110, therefore, the height, $H_{Array}$, may be adjusted 123 by array position assembly 160 to be about 1.5 times the width, $W_{Array}$. The design of the arrays 130 allows the collecting unit 110 to remain low profile, yet provide very large concentration ratios.

Linear Fresnel lenses can be made from extrusion, casting into the polymer, or applying ultraviolet (UV) beams or E-Beam (energy cured polymers) over a sheet or roll of material (e.g., a plastic). For commercial and industrial concentrators, the width of the lenses would normally be selected from a range of about 8 inches to about 8 feet or more. Most industrial extrusion lines have widths of about 4 feet wide at their maximum; however, there are extrusion lines (or devices) that are over 8 feet wide such that these or other practical limitations may set the lens width of the lenses in each lens array. The Fresnel lenses can be made from thicknesses of about 0.03125 inches to about 0.25 inches or more depending upon the application. In some cases, the Fresnel lenses can be made in sections and pieced together in both (or either) length and width, forming widths of over 4 meters and nearly any desired lengths.

Fresnel lenses for the lens arrays of the concentrators can be made, in some exemplary processes, at a rate of over 20 feet per minute in extrusion and over 100 feet per minute in energy cured casting. As a result, it will be appreciated that the production of the Fresnel lenses may be very fast and is readily scalable. Materials of choice for the Fresnel lenses include, but are not limited to PMMA (or poly(methyl methacrylate)), acrylic, fluoropolymer, polycarbonate, and glass. Selection of the width of the lenses corresponds in most cases to the focal length of the lenses (and desired distance to the receiving/leading edge of the light wafers of the collector/concentrator), and, therefore, in an industrial concentrator the height of the overall device. Generally speaking, to reduce Fresnel reflections, focal lengths are normally about one to two times the width of the Fresnel lens.

Fresnel lenses used for these concentrators can be curved Fresnel lenses or flat Fresnel lenses. Typically, the lenses for these concentrators are positioned within the lens array and supporting frame with the structures of the Fresnel lens facing down or away from the Sun (e.g., FIG. 1 shows, for ease of illustration, the curved and structured part of the lenses 134 up but this arrangement may be reversed in some embodiments of the concentrator 110). The Fresnel lenses made with the structures down provide a smooth top, which makes the lenses easier to clean, whether they are flat Fresnel lenses or curved Fresnel lenses.

The decision as to whether use curved Fresnel lenses or a flat Fresnel lenses may be based upon the application, costs, and other factors. An advantage to using curved Fresnel lenses versus flat Fresnel is their ability to more readily focus larger angles of incidence making them a more forgiving lens for focusing. The facets in the Fresnel lenses can be made in various sizes, from as little as $1/1000$-inch to over $1/8$-inch with from about 1,000 facets per inch to less than 6. On the average, an extruded lens will have between 50 and 500 facets per inch, and most energy-cured lenses will be much finer, e.g., utilizing between 100 and about 1,000 facets per inch. Normally, energy-cured lenses are made on thinner films, and they may then be laminated to thicker PMMA or acrylics for structural integrity.

For the concentrators described herein such as concentrator 110, multiple lenses 134 are lined up in a frame 122, and their energy 108 is joined together by light wafers 142. This allows the Fresnel lens array 130 to have a low profile (smaller width, $W_{Lens}$, and, therefore, shorter focal lengths (i.e., $H_{Array}$ in preferred arrangements of concentrator 110) creating a lower profile) yet combine their energy together for a higher concentration ratio.

In some cases, the light wafers 142 are sheets of glass or plastic (e.g., one preferred material is low-iron glass) of various thicknesses and sizes. The wafers behave much like commonly used fiber optic cable. Light enters through the edge 144 and bounces around the inside of the light wafer (or its planar body), which results in loss of very little energy and the received/focused light 108 from lenses 134 exits out the other end. As shown in FIG. 1, each lens 134 may be paired with at one (or more in some embodiments) light wafer 142 (e.g., be focused onto one edge 144). The glass or plastic can be bent to aim its end or edge 146 at a target, which in this case is a cylinder or tube 150 (while some embodiments may target a flat collector such as a collector or receiver with PV material or the like). Bends in the wafers 142 (e.g., in the sheets of glass or plastic) preferably are gradual so as to prevent the rays from leaking or escaping (or limiting such losses) by providing light ray bounces that exceed +/−21 degrees. In some embodiments, the light wafers 142 may be made of float glass, and then bent to the engineered shape with heat, or the wafers may be poured directly into the mold needed.

The Fresnel lens array 130 focuses light 108 down into the first or receiving ends of the light wafers 144, which are supported in plate or tray 124. The focused or concentrated light 108 then travel through the wafers 142 to the collector hub and cylinder collector 150 (exits second or outlet end 146 of each wafer 142). In other words, the lenses 134 focus into the side 144 of the glass or plastic sheets 142 and light 108 travels through the "wafer" using total internal reflection (TIR) entering the wafer and remaining within the limits of TIR (e.g., about +/−21 degrees). The glass or plastic wafer may be from less than $\frac{1}{32}$" to over several inches thick.

The incoming rays 108 must remain parallel to the entrant point at the side 144 of the glass or plastic (or other material) wafer 142 within the necessary +/−21 degrees parallel with the wafer sides, even in the bends of the glass, plastic, or ceramic wafer 142. Since the rays 108 travel through the glass, plastic, or ceramic wafers 142, it is preferred that care is taken in the design/installation of wafers 142 to not bend the wafers 142 radically so as to successfully contain/retain the rays 108 in the wafers 142 between ends/edges/sides 144, 146. Briefly, each of the wafers 142 is configured or bent gradually to provide a light path for light 108 from a particular one of the lenses 134 toward the collector 150 and its contained working fluid 113, 115.

Since very little energy is lost after the rays 108 enter the wafers 142 (dependent upon the purity of the materials used for the wafers 142), the rays 108 move through the wafers 142 at high efficiencies. The net ray collection count in a concentrator assembly 110 of the present invention will likely be in the range of about 90 percent to about 100 percent. The net efficiencies with the surface interface losses considered will likely be up to about 80 percent to about 85 percent. General losses occur as Fresnel losses at the bends of the wafers 142, and 5 percent coming into the wafers 142 at edge 144 and back out of the wafers 142 at edge 146. However, despite these losses, the Fresnel lens/wafer combination concentrator 110 exceeds the efficiency of most other concentrators and is less expensive to manufacture.

The CSP system 100 may use the concentrator assembly 110 to heat a wide variety working/transfer fluids. For example, the fluid 113, 115 may be a glycol, water, nearly any liquid material, and a gas such as air to provide solar energy with heated fluid 115 to the power generator/thermal storage 116 (i.e., any device that may utilize energy in fluid 115). In other embodiments, not shown but part of this description, the concentrator 110 may be configured for use as a PV concentrator or a combination of PV and thermal concentrator such as by replacing all or portions of the absorber tube 150 with PV devices such as solar cells or panels or the like.

As shown in FIG. 1, the CSP system 100 may fill the collector or absorber tube 150 with glycol, oil, liquid salt, or any number of liquids/solutions. In one case, the CSP system 100 is configured as a waterless, high-efficiency thermal system. Particularly, the collector system with absorber tube 150 may be a closed loop system with the oil or other transfer fluid 115 filling the collector pipe 150 and being circulated (via pumps or the like not shown) into a coil in a salt tank by the power generator/thermal storage 116. The salt is heated by the fluid 115 and, in turn, heats a hydrogen unit for a heat exchanger driving a Sterling engine (e.g., closed-loop hydrogen process). In other cases, the collector 150 may be configured to wrap around a heating unit in the generator/storage 116 to directly heat the hydrogen (or other material) driving a Sterling engine and heat exchanger. Part of the energy 108 may be collected concurrently (or in place of fluid 115) in some of wafers or the like in a PV application.

The CSP system 100 may be operated as a one-axis system without tracking as to seasons. However, such a system 100 would have some issues or nuances. The one-axis system 100 would be configured with array position/tracking assembly 160 to track much like a Sun trough, e.g., running north and south in length and tilting east in the morning and tracking the Sun directly overhead to west in the evening. The main issue is the seasonal azimuth of the Sun. Changes in seasonal azimuth in general prohibit perfectly aligned rays from being properly directed into the sides 144 of the wafers 142. Much of this is a result of the focal length changes in the linear lenses 134 being either two long or too short, therefore missing the edge 144 of the wafers 142 slightly.

Two factors may be used in implementations of the present invention to overcome this problem almost completely. First, the wafers 142 can be made slightly wider than would be needed should a perfect focus be achieved. In other words, the first or receiving edge/end 144 would then be large enough that in mid-summer the rays 108 would be centered in its width while in other seasons the rays 108 (or most of the rays 108) would still be within the boundaries of the edge 144 (i.e., the focal point/line of the lenses 134 would generally coincide with the position and width of the edges 144). Second, the lenses 134 may have a second modified "axis" by configuring the concentrator assembly 110 to have the ability (via array position/tracking assembly 160) to raise slightly or lower slightly (123) with the azimuth of the Sun 102, thereby adjusting the focal lengths of the lenses 134 slightly to accommodate the seasonal azimuth helping to eliminate over and under focus (e.g., vary the array height, $H_{Array}$, a small amount over the year to account for seasonal movement of the Sun 102).

Such an arrangement and operation of the is explained in further detail with reference to FIG. 2, which shows an end view of a concentrator assembly 210 with a tray 222A and 222B holding lenses 234 of a lens array 230 in an up or summer position (shown at 222A) and in a lowered/down or winter position (shown at 222B). A drawback of most parabolic trough concentrators is that as the seasonal azimuth changes the focal length of the rays and the concentration efficiency greatly diminishes as many of the rays do not hit the collector properly. Whereas complete 2-axis adjustments provide accurate focus, it is impossible to take lengthy arrays and turn them on their side and accomplish 2-axis tracking in a conventional parabolic trough concentrator.

In contrast, though, the concentrator assembly 210 includes a lens array 230 of lenses 234 (e.g., an array or number of linear Fresnel lenses). A servo 260 (or similar vertical positioning device) may be used to move 261 the lens array 230 (or the lenses 234 on support tray up 222A and down 222B to adjust, for the shortening of the focal length in the winter or when the normal incident angle of the Sun relative to the positioning of the concentrator assembly 210 provides angles other than perfectly perpendicular. By having the ability to lower or raise 261 just the lens portion 222A and 222B to lenses 234 can be positioned to received sunlight 204 and properly focus the light 208 onto or so as to meet receiving surfaces 245 on the first/receiving ends/edges 244 of light wafers 242 as the focal length decreases or increases.

The height, $H_{Array}$, of the lens array 230 is measured from the lenses 234 (or their back or inward facing surface) to the receiving surfaces 245 of the first ends 244 of the wafers 242, and the servo 260 is driven to move the tray 222A, 222B through a relatively small adjustment range (or adjustment height, $H_{Adjustment}$) so as to properly account for changes in the Sun's azimuth. Such adjustments may be performed periodically such as weekly or even daily to maintain the focusing of light 208 onto the receiving surface 245 of wafers 242. The ends 244 may protrude outward some distance from a support plate 224 attached to housing 220 or may be flush as shown in system 100.

Such operation of the servo or vertical positioning device 260 allows the concentrator assembly 210 to be much more efficient than a conventional trough concentrator. In addition, this movement 261 does not affect the stationary positioning of the collector itself or of the light wafers 242, which remain attached at their second or outlet ends 246 to the sides of the stationary collector or absorber tube 250 (e.g., remain targeted onto a desired collector surface which may be PV materials or devices or sides of a fluid containing tube). While the whole unit (e.g., frame 220 containing the collector 250, wafers 242, wafer support plate 224, and lens array 230) rocks back and forth from sunrise to sunset in a one axis system, the servo 260 operates in assembly 210 to continue to adjust 261 the lenses 234 slightly up and down through a height adjustment, $H_{Adjustment}$) using servos or other means of mechanical adjustment 260 for the time of season to adjust for the season and the corresponding Sun's seasonal arc.

Figure 3:
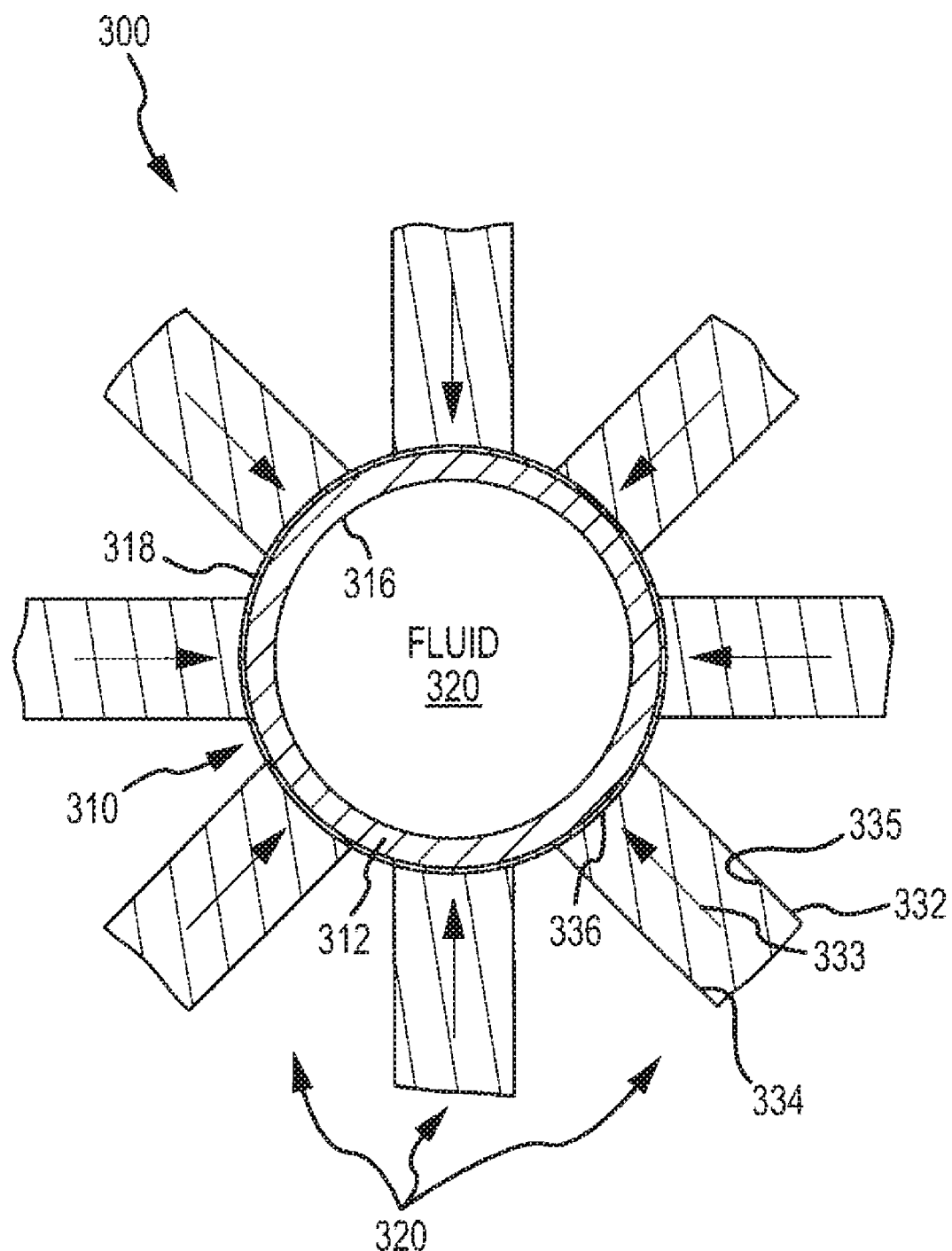
FIG. 3 is a sectional end view of a collector assembly showing its star-like appearance due to the positioning of 2 to 12 or more light pipes or wafers (with 8 shown in this non-limiting example) about a circumference of a collector or absorber tube.

The concentrator assemblies described herein may be thought of as including a "star" collector because of its sectional or end view as shown in FIG. 3 with collector assembly 300. As shown, the collector assembly 300 includes a collector or absorber tube 310 with a cylindrical sidewall 312 having an outer surface 314 and an inner surface 316, which defines an inner volume or space through which the transfer or working fluid 320 is caused to flow during use of the collector 300. The star collector 300 further includes a light wafer array 330 that includes a number (8 are shown but up to 12 or more could readily be used to suit a lens array, a circumference of tube 310, or the like) of light wafers or planar light pipes 332.

Each wafer 332 extends from a first or receiving end (not shown) that receives light focused from a linear lens of a lens array to a second or output end 336. The second end 336 is positioned flush against the outer surface 314 of collector sidewall 312 or is targeted to direct the light 333 onto such surface 314. The light 333 is retained via TIR within wafer 332 as it strikes and bounces off of inner surfaces 334, 335 of planar wafer 332. In some cases, the number of wafers 332 is chosen in combination to the outer diameter of the collector/tube 310 such that all, or nearly all, of the outer surface 314 is covered with edges/ends 336 of wafers 332 in wafer array 330.

The star collector 300 is unique as it allows incoming energy 333 from the light wafers 332 to strike the collector 310 from all (or many) angles about its circumference rather than from a single direction as is the case with parabolic trough collectors. In other words, the star collector 300 is a 360-degree collector. The light 333 can exit the end 336 of the wafer 332 and directly strike the cylinder's sidewall 312 on its outer surface 314.

Figure 4:
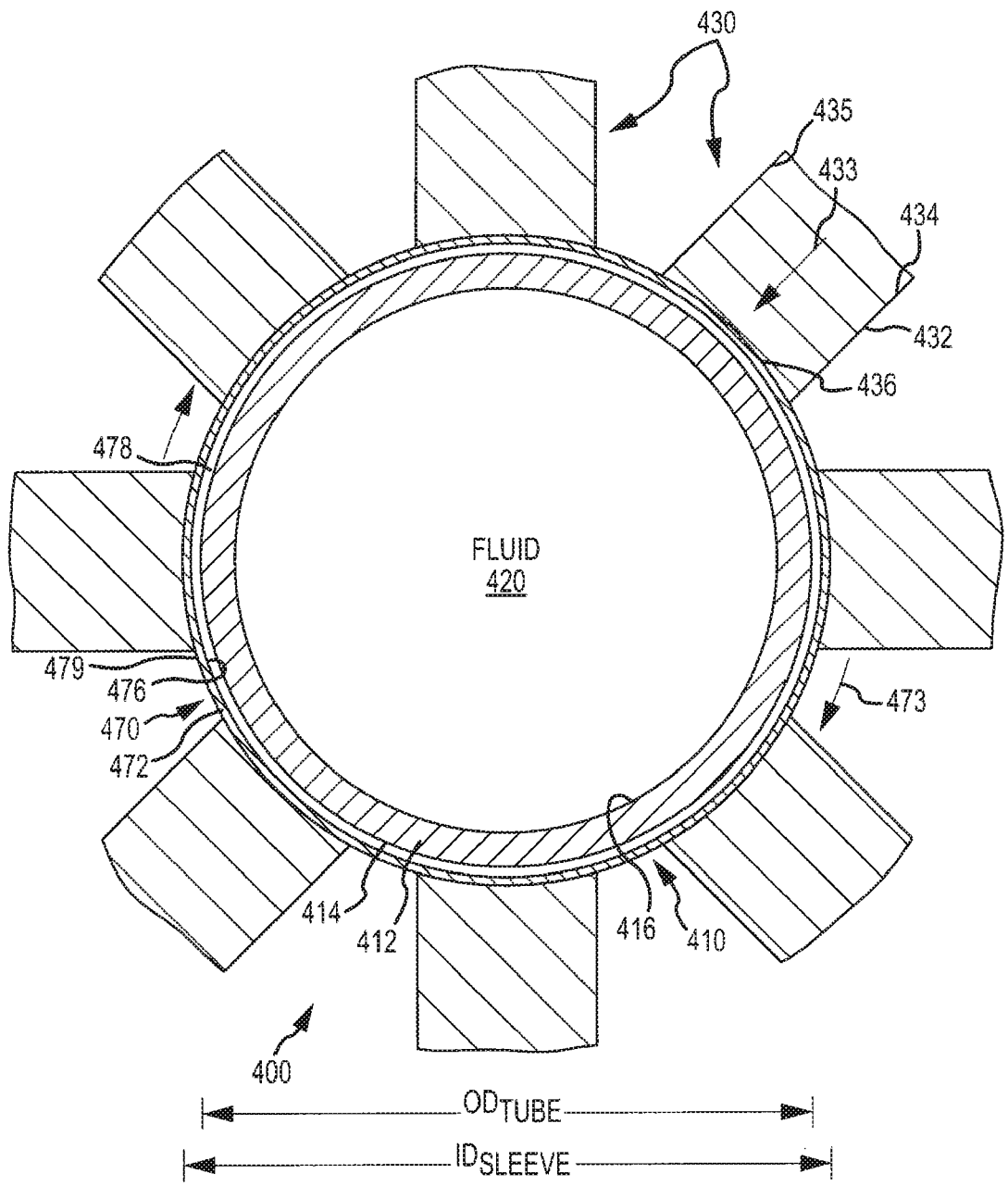
FIG. 4 illustrates a collector assembly in a sectional view showing use of a shell/sleeve to support second/output ends of light wafers proximate to an absorber tube or collector while allowing the shell to rotate with tracking in a concentrator assembly.

However, since the wafers may be moved during daytime and seasonal tracking movements, it may be useful in some embodiments to have a slight space between the end of the light wafer and the cylinder or absorber tube. FIG. 4 illustrates such a collector assembly 400 that includes a stationary or fixed absorber tube or collector 410. The collector 410 includes a cylindrical sidewall 412 with an outer surface 414 and an inner surface 416 defining an inner space or volume through which fluid 420 flows during use of collector assembly 400. The collector assembly 400 further includes a wafer array 430 with a plurality (e.g., 4 to 12 or the like) of planar light wafers 432 with inner surfaces 434, 435 that trap light 433 from a corresponding lens (not shown) and discharge all or much of the light 433 out a second or output end 436.

The collector assembly 400 allows movement of the ends 436 of the wafers 432 by providing a cylindrical shell 410 with a sidewall 472 having an outer surface 474 and an inner surface 476 proximate to but spaced apart from the outer surface 414 of the absorber sidewall 412. As a result, a space or void 478 is defined between the shell 470 and the absorber tube 410 such that the shell 470 may rotate 473 about the outer surface 414. In some cases, a servo motor (not shown) may rotate 473 the shell 470 to account for tracking movements of the concentrator assembly containing the collector assembly 400 or the shell 470 may simply move with the ends 436 of the wafers 432, which may be rigidly attached (with transparent adhesive or the like) with outer surface 474 of shell sidewall 472. The gap or space 478 is defined by the values of the inner diameter, $ID_{Sleeve}$, of the sleeve or shell 470 and the outer diameter, $OD_{Tube}$, of the absorber tube 410 (which is smaller to create a rotation-facilitating space between the stationary and rotating 473 components).

In this manner, the wafers 432 and shell 470 have the ability to rotate 473 around the collector 410 holding the liquid, air, or solid 420 yet transmit the heat 433 to the collector 410. In some cases, the sleeve 470 might also be wrapped in a PV material (facing outward on outer surface 474). The sleeve sidewall 472 may be formed of a translucent or light transmissive material to transmit the light 433 onto the absorber 410. In other embodiments, though, the sidewall 472 may be made of a heat conductive material such that it heats up and then transfers heat to collector 410 and working fluid 420, e.g., so that the interior 416 of the collector 410 and its contents 420 heat up and hold heat unit dispersed or used in energy production. In such latter embodiments, the space or gap 478 may be filled with a heat transfer fluid that facilitates more rapid heat transfer (relative to air) while allowing ready rotation 478 of the shell 470 about the tube 410. In either embodiment, it may be desirable to minimize the size of the gap 478 to control inefficiencies of heat transfer or loss of energy between shell 470 and tube 410.

As will be understood, a concentrator assembly that combines the above-described features (i.e., a sleeve 470, wider than needed light channels/wafer thickness (or multiple sheets or wafers combined as shown below) that give the rays a larger "target" into the side of the wafers and help to capture the rays, and the ability to raise and lower the lens array to adjust their height or separation from the ends/edges of the light wafers) allows a "game changing" amount of heat to be driven to the collector. The inventors believe CSP systems with one or more of these concentrator assemblies represent a disruptive technology because of low cost to manufacture, low cost of maintenance, and extremely high heats obtained at the collector (and in its working/transfer fluid or on PV materials/devices). For example, a linear device CSP system will be able to safely and inexpensively provide a temperature in excess of 1,000° C. for vast amounts of fluids. The volume of liquid/fluid heated and the temperatures of that liquid will be able to far exceed thermal towers, parabolic troughs, and other devices. Another large advantage of the device is that the plumbing for the device (e.g., the absorber tube) can remain stationary while the wafers and other portions of the concentrator assembly pivot around the absorber tube or heat-receiving collector components. Hundreds or even thousands of feet of absorber tubing may be integrated into a solar field pipeline achieving a large amount of cumulative solar energy in a CPS system (with the shell being heated and heating the absorber tubing or transmitting the light/energy through to the absorber tubing so as to effectively heat the transfer fluid).

The collector assembly can be very long each linear lens along with an associated planar light wafer and absorber tube and two or more collector assemblies of a CSP system may be linked together in "rows" of collectors. As a result, a larger volume of working fluid may be heated with this device than with a conventional trough device. The CSP system will likely have much greater heat delivery with a fraction of the per foot cost and with less maintenance when compared to a CSP system using parabolic troughs.

For instance, a 50-foot wide collector (measured across a width of a plurality of lenses in a lens array) may have a concentration ratio of: CR=W/SA×EFF of collector, with CR=Concentration Ratio; W=Width of device; SA=Surface Area of collector; and EFF=Efficiency. Further, a collector assembly may utilize a cylindrical absorber tube that would have a surface area determined by the equation SA=Diameter of Tube×Pi. Hence, a 50-foot wide collector with a 2-inch diameter collection pipe at 80 percent efficiency would deliver the following: 50(12)/2(3.14)×0.80=600/6.28(0.85)= 95.54 CR (i.e., a concentration ratio of 95.54)

An impressive part aspect of the described concentrator assembly is that it is a continuous and not a spot collection system. In addition, it is three to ten times more powerful than most trough collector systems. This can equate to more than one thousand degrees Celsius of continuous heat. Therefore, at sea level, a 50-foot wide by 1000-feet long concentrator assembly would be able to deliver 1,184.513 kilowatts (KW) based on the following: (1) 15.24 meters×304.80 meters=4, 645.15 square meters; and (2) (4,645.15) (1,000 watts at sea level) (efficiency of 0.85) (efficiency of conversion device of 0.30 for a sterling engine) or (4645.15)(1,000)(0.85)(0.30)= 1,184,513.25 watts or 1,184.513 KW. This efficiency makes the collection system extremely efficient while still being inexpensive to manufacture.

In some embodiments of a CSP system, the tops of the lenses (which may be flat or curved) may be maintained in a relatively clean condition by including a washing system. The automatic washing system may be configured and positioned relative to the lens array of each concentrator assembly to spray and/or wipe the light receiving surface or outer surface of the linear lenses (e.g., spray and then wipe with a car-wash like device lengthwise) at regular intervals (e.g., daily, weekly, or the like). Even without regular cleaning, though, the lens arrays described herein are far more forgiving than the level of cleanliness needed for traditional mirrored parabolic concentrators.

In summary, it may be useful to restate the general parts for a collector assembly of the some embodiments of the invention. Particularly, the parts of a collector assembly with a design with 8 lenses that are each 6-inch wide lenses (i.e., an array that is about 48-inches across or wide and any useful length long) may include: (1) 8 identical lenses (e.g., linear Fresnel lenses of like construction); (2) a center top wafer extending from straight down from a support plate or tray toward the absorber tube (or another type of collector); (3) a center bottom wafer extending about the absorber tube and arranged to direct light upward into the absorber tube; (4) two sets of identical side wafers (3 each) bent or curved gradually from the support plate into the opposite sides of the absorber tube; (5) a frame supporting the lenses of the lens array (e.g., a sealed frame or housing with a bladder and servos for raising and lowering the lenses to adjust the height of the array with seasonal changes in the Sun's position to direct or focus light passing through each lens onto an edge/side of a light wafer); and (6) a cylindrical, flat, or other collector (e.g., an absorber tube through which a transfer or working fluid is caused to flow). An interesting aspect is that there are very few parts to the concentrator assembly, which facilitates its simple and inexpensive manufacture, assembly, and maintenance.

Figure 5:
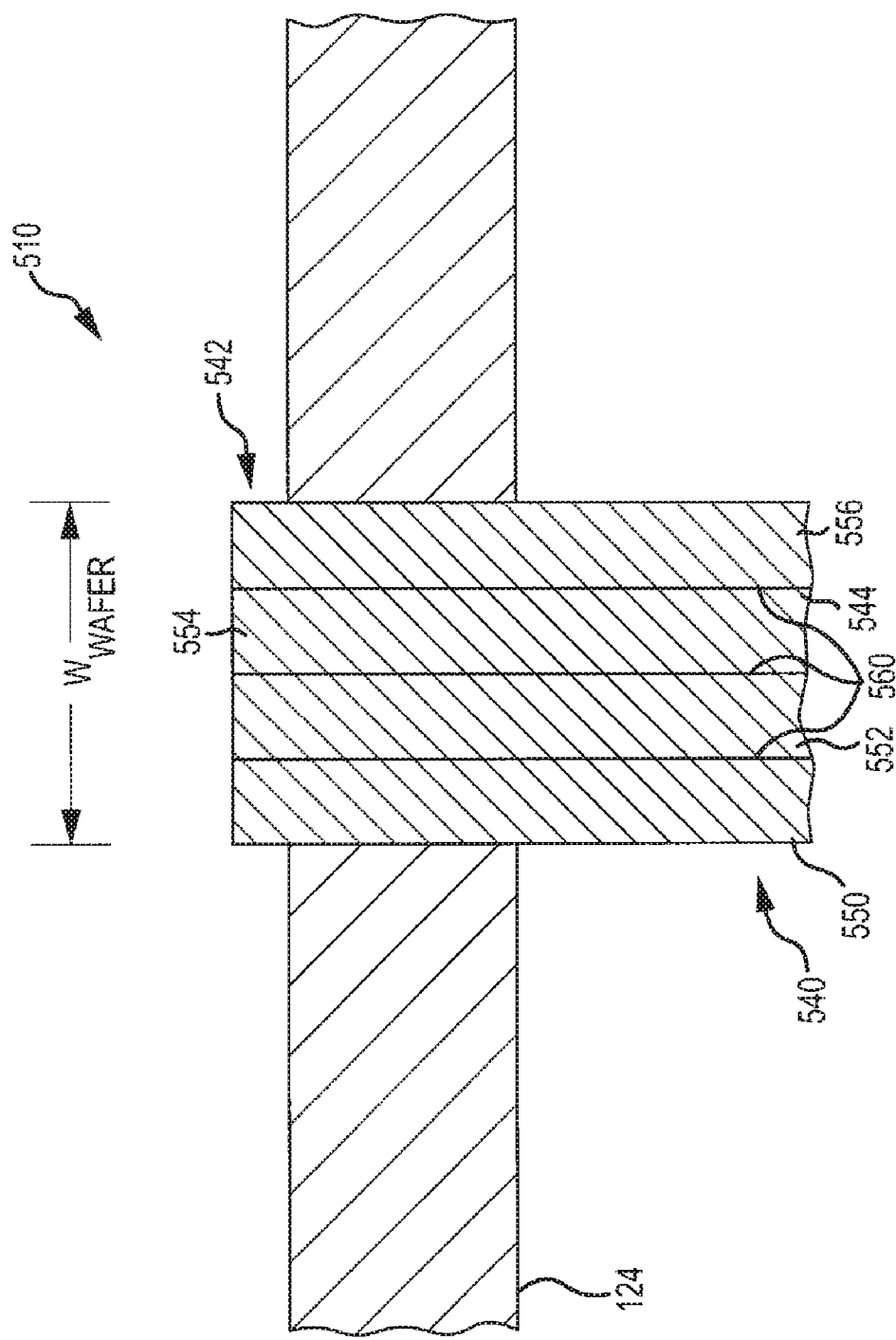
FIG. 5 shows an embodiment of a light wafer that is a composite design including two or more planar sheets of material to create a wafer with increased width to provide an enlarged or wider light-receiving surface at an end or edge of the light wafer.

FIG. 5 illustrates a portion of a collector assembly 510 that includes larger wafer edges or ends to reduce losses of focused light. As discussed above, it may be desirable to increase the receiving surface upon which linear lenses need to be focused to reduce the accuracy at which the Sun has to be tracked during the day and/or over seasons. To this end, it may not be practical or cost effective to provide a very thick light wafer with a unitary design. Instead, the assembly 510 includes a support plate 124 (as shown in the CSP system 100 of FIG. 1) that is used to support the first or light receiving end/edge 542 of a light wafer 540.

The light wafer 540 is fabricated from two or more planar sheets with four sheets 550, 552, 554, 556 being shown in FIG. 5. The sheets 550, 552, 554, 556 may be placed to contact each other at mating surfaces or joints 560, and affixed to each other to form wafer 540 such as through the use of an adhesive or other fabrication methods (e.g., EVA or the like). In this manner, the end 542 provides a light receiving surface 544 that has a width, $W_{Wafer}$, that is four times larger than a single sheet 550, 552, 554, 556 and increases the likelihood that focused light from a linear lens paired with the wafer 540 can positioned and oriented to have its focal point (or line) on the surface 544.

Figure 6:
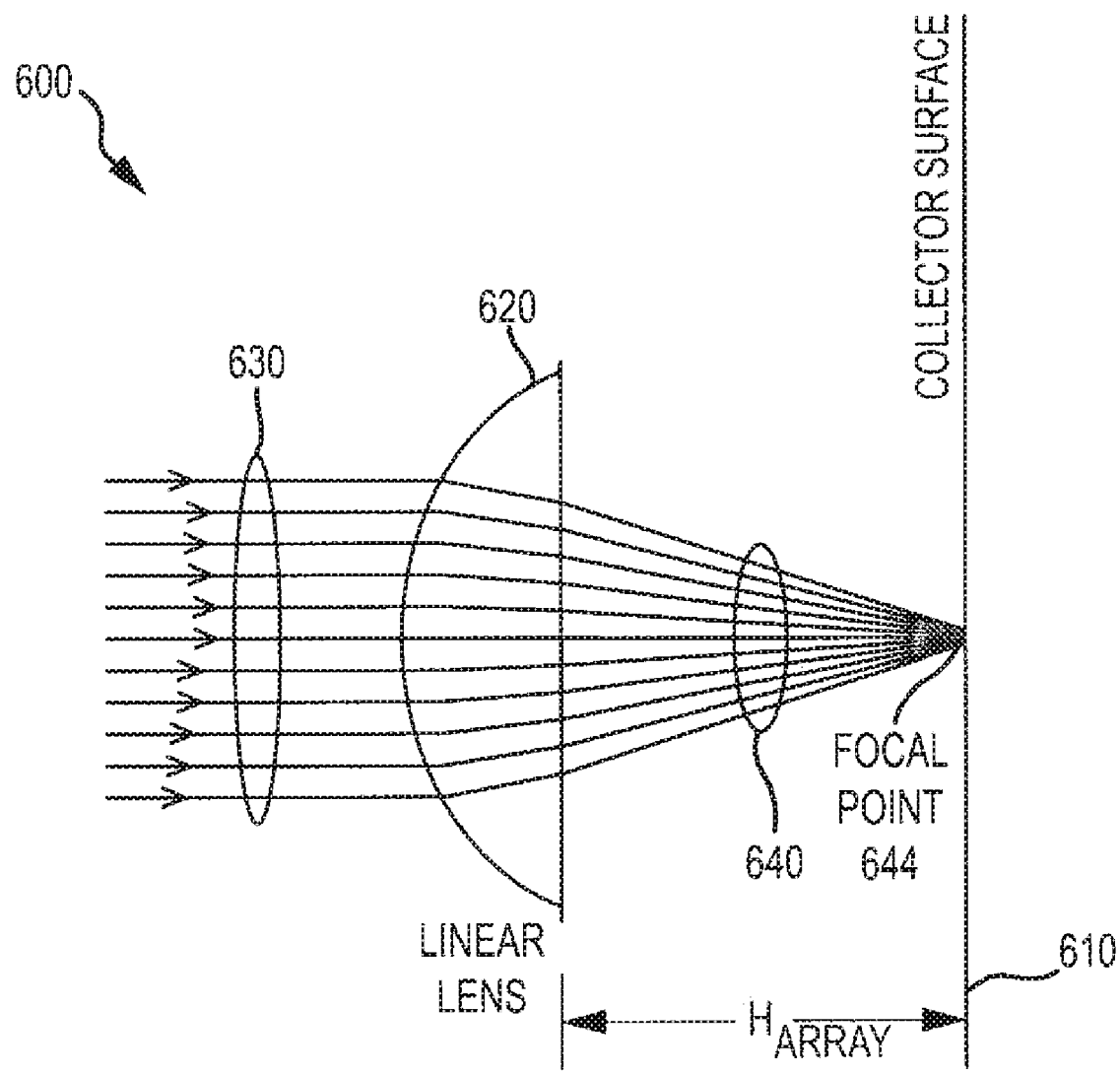
FIGS. 6 and 7 illustrate ray tracing plots for a portion of concentrator assembly with a fixed array height but light at two differing seasonal Sun positions.

At this point, it may be useful to again stress how the use of linear lenses such as linear Fresnel lenses arranged in a planar array that can be moved with a 2-axis tracking/positioning system facilitates that changing of the focal point(s) of each concentrator assembly of a CSP system to suit seasonal locations of the Sun (and, in some cases, to first calibrate an installed assembly after fabrication/shipping). As the altitude of the Sun changes during the seasons, a one-axis tracking system that relies on lenses or mirrors that focus the light of the Sun on a receiver will not optimally concentrate the light on the receiver for the various angles of elevation. Such an issued can be seen through a quick review of FIGS. 6 and 7. FIG. 6 illustrates a portion of a concentrator assembly 600 during use to receive light 630 with one or more linear lenses 620 and focus light 640 onto a focal point 644. In FIG. 6, the height of the array, $H_{Array}$, is correct for the position of the Sun providing light 630 to have the focal point 644 coincide with the collector surface 610 and any edges/ends of light wafers that may be collocated on such surface 610. However, in FIG. 7 the same lens/surface separation, $H_{Array}$, results in the focal point 644 being spaced apart from the collector surface 610 (i.e., the Sun's seasonal position has caused the lens 620 to lose its focus onto the surface 610).

Figure 7:
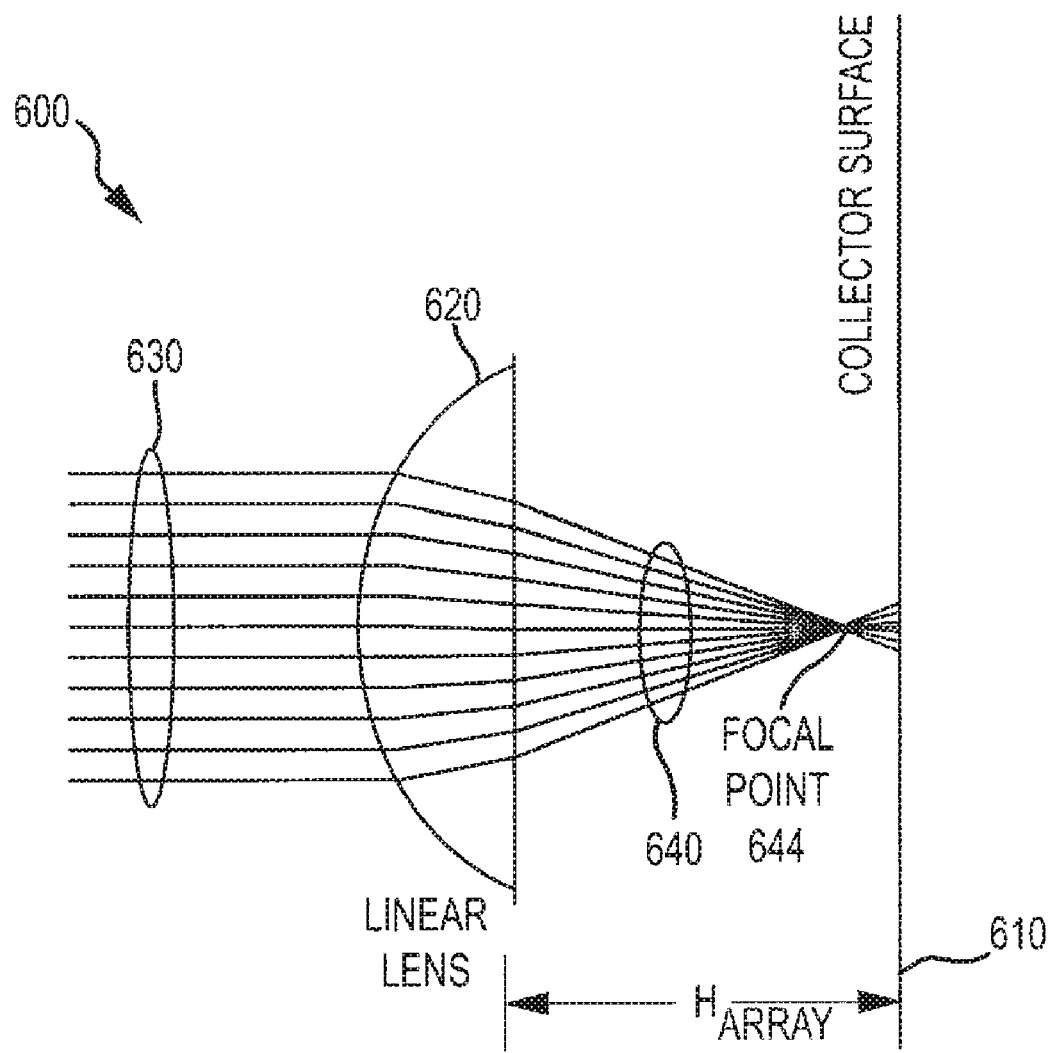

The cause of the change between operation of assembly 600 in FIGS. 6 and 7 may be because the path lengths after refraction or reflection change with the Sun's altitude angle and because only one-axis is presently being used in assembly 600 (day tracking). Hence, the plot of FIG. 6 shows the incoming rays 630 and spot patterns 644 at 27 degrees from the vertical along the axis of a cylindrical linear lens are compared to the incident rays at zero degrees incidence, and the assembly 600 in FIG. 6 achieves reasonable good focus onto the collector surface. However, the plot of FIG. 7 shows operation of the assembly 600 at a differing Sun position, and the incident rays are 27 degrees from the vertical in a direction perpendicular to the plane of the plot. Proper focus is not achieved as the focal point 644 is now spaced apart or is not coincident with collector surface 610. Spot diagrams of an array of linear lenses focusing on a cylinder collector 610 also indicate good focusing along the length of the cylinder (along the length of the linear lenses of a lens array) in the arrangement of FIG. 6. However, spot diagrams of the situation shown in FIG. 7 show that there is a spread of rays along a Y-axis (e.g., focal point 644 is not on the cylinder's surface), which is detrimental as some of the rays 640 will miss the collector 610 (and not be available to heat a transfer fluid (or strike PV material)). The invention described herein, though, addresses this problem by moving the lens array and its lenses (e.g., arched, linear Fresnel lenses) to an optimal position or distance, $H_{Array}$, from the collector surface to suit the Sun's seasonal position to capture the maximum amount of light possible.

Figure 2:
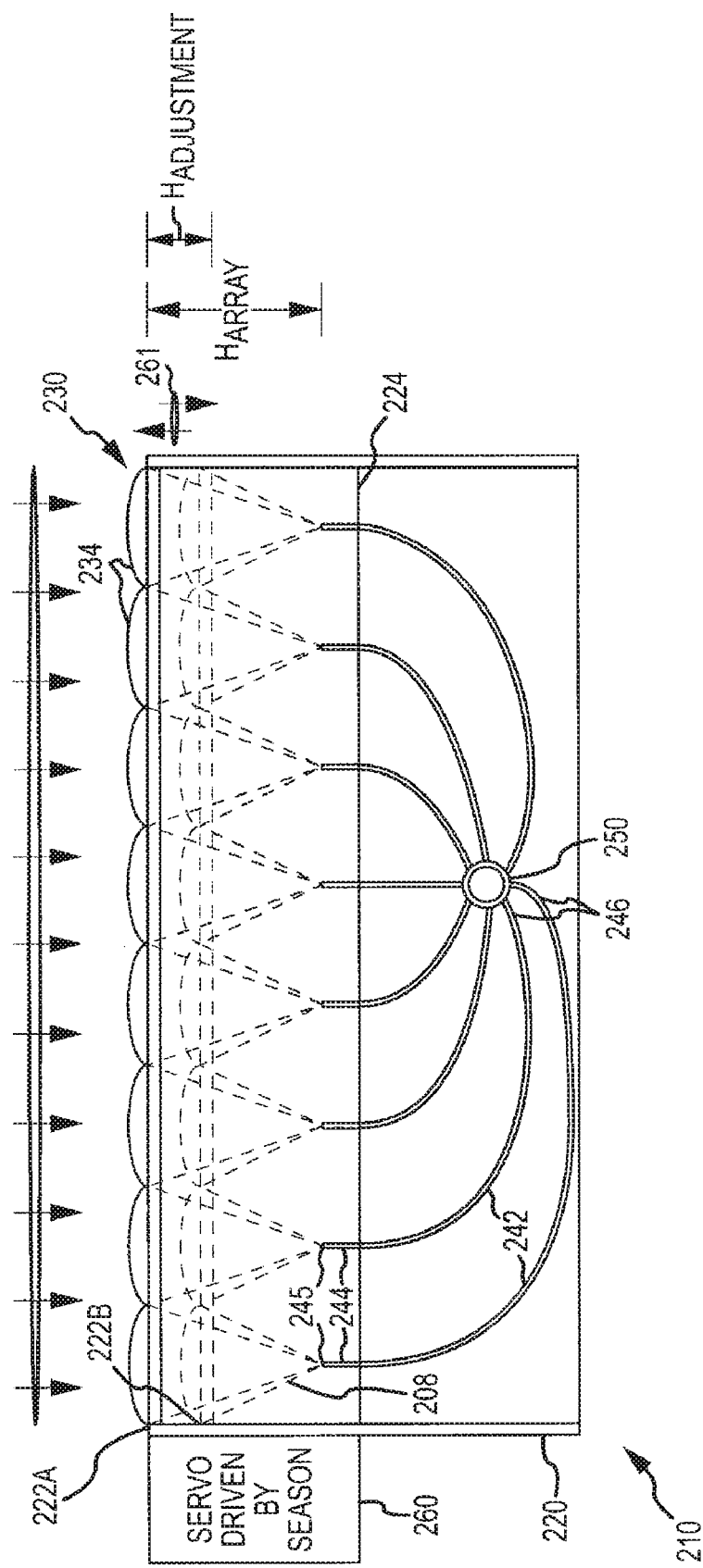
FIG. 2 illustrates an end view of another embodiment of a concentrator assembly such as may be used in the CSP system of FIG. 1 or other CSP systems.
Figure 8:
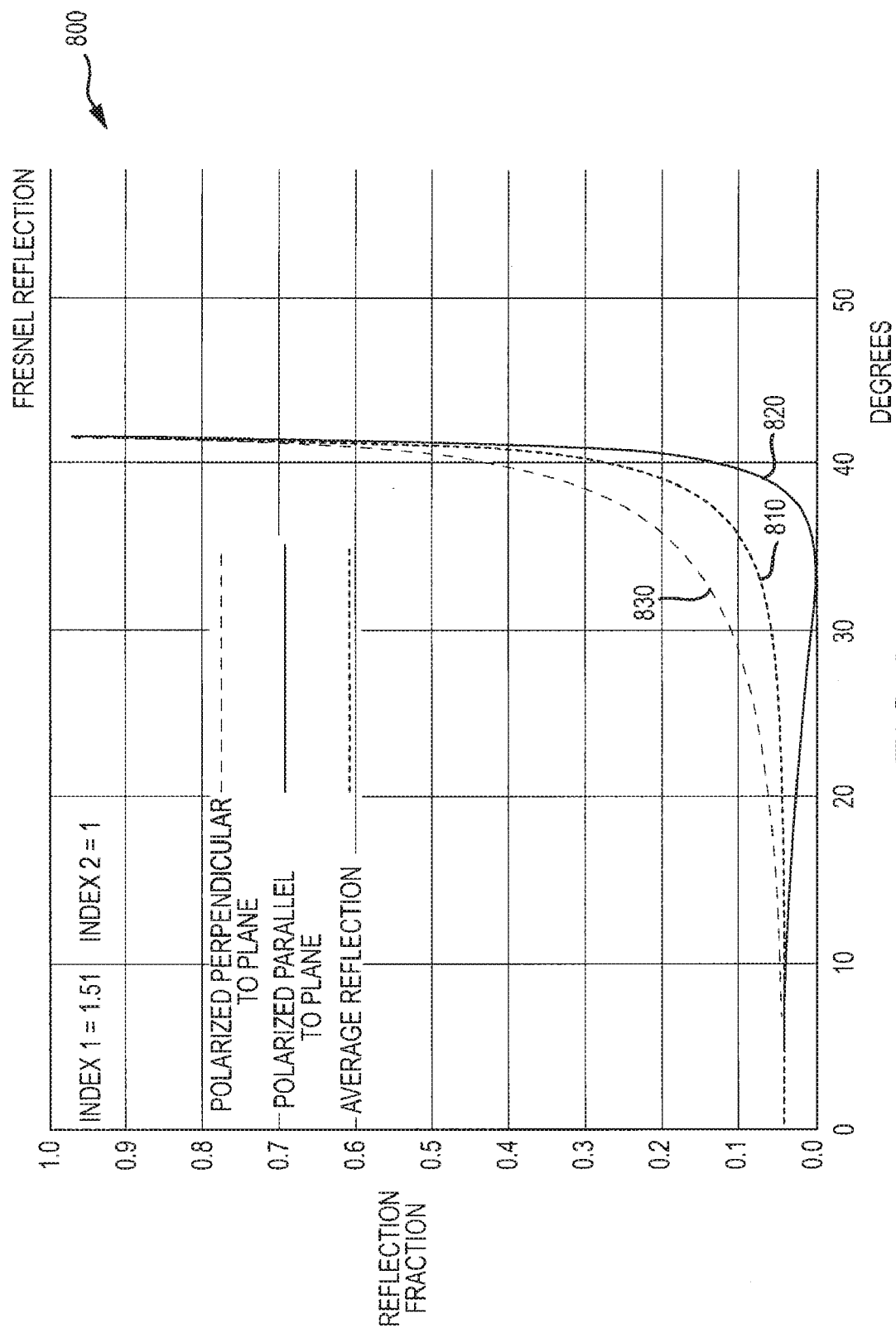
FIG. 8 is a plot indicating a fraction of light reflected versus incidence angles in a light wafer illustrating aspect of total internal reflection utilized in the present invention.

In order to contain the maximum number of rays possible in the wafers of a concentrator assembly (such as those shown in FIGS. 1 and 2 (and star collector in FIG. 3)), some considerations about total internal reflection (TIR) should to be taken into account. As will be understood by those skilled in the art, there is a dependence of the intensity of rays as a function of the angle of incidence when in a medium of higher refractive index than the surrounding medium. For example, FIG. 8 provides a plot 800 that was created to compare a fraction of reflection (Y-axis) to the angles of incidence of light (X-axis) within a material (such as a light wafer), e.g., for a material with an index of refraction of 1.51 when the surrounding index is 1.00 (air). The plot 800 includes lines indicative of average reflection 810, light polarized parallel to plane 820, and light polarized perpendicular to plane 830 to illustrate Fresnel reflections to illustrate total internal reflection (TIR). The plot 800 shows that when the angle of incidence is around 42 degrees, most of the energy of the ray is reflected (via TIR) or trapped within the material. Hence, for the planar optical wafers described herein, as long as the angle of incidence is greater than the critical angle, rays in the wafers will be contained in the wafer and directed on to the second or output end/edge of the wafer to be targeted onto the collector (or a shell rotating about an absorber tube in some embodiments).

Hence, in designing a collector assembly in order to meet the above requirement to get TIR, the angles of the rays traveling through the wafer need to be taken into account. If the angles are too steep the rays will leak out of the wafers before they reach the second end of the wafer and the collector. For example, this can happen in the curved regions of the wafer where between points of rays striking the wall the curvature of the wafer has caused the rays to intersect at a steeper angle than the critical angle. To help control such loss, the collecting lenses (e.g., linear Fresnel lenses) preferably are selected to not be of too low of an F number. In Fresnel embodiments, all the rays from each Fresnel lens can be designed to enter the corresponding wafer, but rays at large angles of incidence will be the angles of low incidence in the walls of the wafers. This happens because there is a 90 degree angle of change from the flat surface at wafer entry to the flat side wall for rays entering the wafer. The extreme rays will be the rays to be first affected by curvatures in the wafers.

Figure 9:
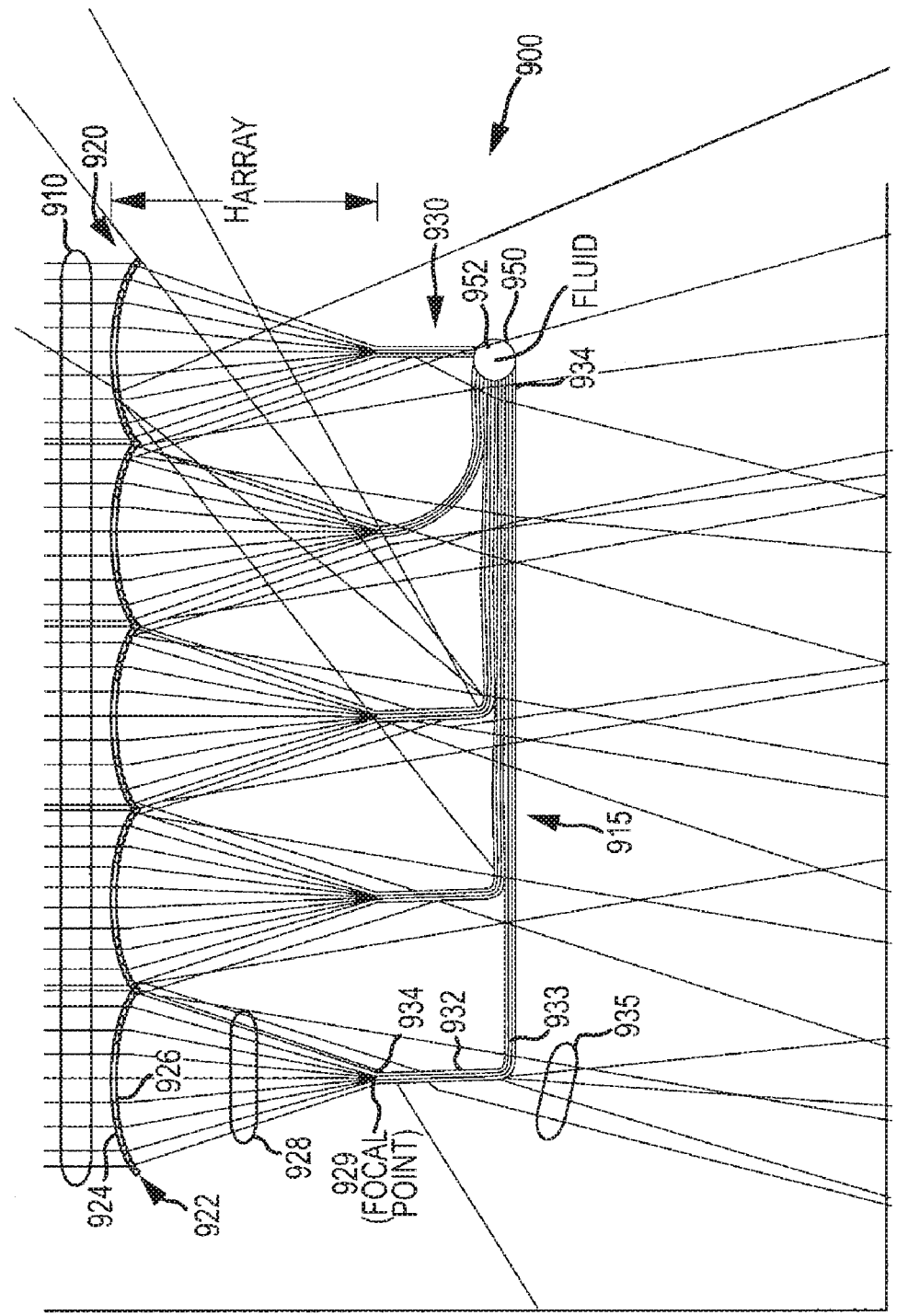
FIG. 9 is a ray tracing of an embodiment of a concentrator assembly useful for showing the effectiveness of the light wafers in collecting/receiving focused light and then adjoining the wafers to a collector to concentrate sunlight, e.g., to heat a transfer or working fluid in an absorber tube.

FIG. 9 provides a ray tracing plot 900 created by the inventors as one proof of concept for a concentrator assembly 915 including a lens array 920, a set of light wafers 930, and a collector 950 (in the form of an absorber tube) carrying a transfer or working fluid 952. The lens array 920 includes five lenses 922 that are spaced apart from a receiving or first end 934 of the light wafers 932 by a predefined distance, $H_{Array}$, which is chosen such that a focal point 929 of the lens 922 coincides with the edge/end 934 of the light wafer 932. Sunlight 910 strikes a first surface 924 of the lens 922 and transmitted out from a second surface 926 as focused light 928.

The focused light 928 enters the light wafer 932 at end/edge 934 where most of the light is trapped 933 via TIR and travels along the light wafer to the second end/edge 934 that targets a portion of the circumference of collector 950 (so as to provide the concentrated energy from light 910 to the fluid 952). Some light 935, though, is lost such as at edge 934 or bends in wafer 932.

The ray tracing plot 900 was generated using a number of assumptions or input parameters. For example, the lenses 922 were each identical linear Fresnel lens that were arched with the facet side 926 facing inward or toward the optical wafer array 930 and the flat or dome side facing outward or toward the Sun or source of light 910. The lens 922 had a width of 8 (such as 8 inches or some other unit of measure may be used), a thickness of 0.2, a pitch of 0.3, and an index of refraction of 1.491. Also, it was assumed that the ray collection fraction was 0.94, the intensity fraction of the rays collected was 0.96, and the net efficiency was 0.90. With the light wafers 932 arranged as shown (with the end 934 substantially coinciding and aligned with the focal point 929 of the lens 922), the temperature at the collector was determined to be 956° C. or nearly 1000° C.

The thickness of the sheets used for the wafers may vary to practice the invention. For example, a thickness in practice ranging from about 0.015 inches to about 3 inches in thickness may be useful for the optical wafers, which may take the form of bent sheets of low iron glass or the like. In some cases, several sheets may be bonded together (e.g., two to four or more sheets of ⅛-inch or other thickness glass, plastic, ceramic, or other material may be used). The adjoining wafers may be glued together with a polymer or epoxy, may be melted together, or joined in any way with materials that have a similar refractive index of the material used in the wafer material (e.g., glass, plastic, or the like). Generally, this refractive index will be between about 1.38 and about 1.95 (or average between about 1.5 and 1.6 which is the range for glass, plastic, or PMMA).

In the tracing, 5 lenses 922 are shown in array 920 but additional lenses may be included in the concentrator assembly 915 (such as 5 more directing light into the "right" side of the collector 950 with one directing light upward into the collector 950 similar to the arranged shown in FIG. 4). Alternatively or in addition, the collector 950, as well as the other collectors/absorber tubes, may have mirrors or mirrored surfaces at locations or positions where edges or ends 934 of light wafers 932 are not provided so as to reflect back energy or light 933 that is not absorbed in the fluid 950. Such mirrors or mirrored surfaces may be internal to the tube 950 (e.g., mirrors affixed to internal surfaces of tube opposite the edges 934 of wafers 932), be unitary construction of the sidewalls of the tube 950, and/or be a separate piece(s) external to the collector/tube 950 (e.g., arched mirrors about the periphery or circumference of the collector 950 opposite edges 934 of wafers 932). Mirrored surfaces/elements may also be positioned on the surface of collectors between adjacent ones of the wafers (such as in the "star" configurations of collectors shown in FIGS. 3 and 4) so as to better capture all light in a transfer/working fluid of a collector.

The inventors created and utilized a number of ray tracing programs to facilitate their design of the collector assemblies described herein as well as using such programs as a proof of concept. To facilitate others skilled in the art in achieving the desirable results obtained by the inventors, the inventors are providing portions of the ray tracing routine source codes for a linear Fresnel lens-based embodiment. Mainly, the Fresnel lenses are designed automatically by the code using the index of refraction of the lens material as well desired focal lengths and the widths of lenses as input to the code. The light wafers are then drawn on the computer screen and adjusted in orientation (curvature/bending) by a designer to eliminate loss of rays at the greatest curvatures. Collection efficiencies and estimated temperatures are also calculated by the code. It will be seen by a study of the code that the code is, in part, a non-sequential ray trace program, e.g., the rays are followed wherever the geometry takes them.

As an example, the routine that finds the intersection of a ray with the wafer walls is given:

```
Sub Intersect_Mouse_Or_Computer_Wafer(i, j, xs, ys, zs, e1x, e1y, e1z, xi, yi, zi, enx, eny, enz, surfaceprevious, surfacemousewafer, contact, intmousewaferflag)
'intersect mouse or computer generated wafers
'inputs
'i=wafer kind, j=structure # of the kind of wafer
'xs,ys,zs starting point of ray.
'e1x,e1y,e1z, direction cosines of ray
'outputs
'xi,yi,zi intersection point
'enx,eny,enz surface normal at intersection point.
'intwaferflag=true if sucessful intersection
'surfacemousewafer mainly sent to ray trace for debugging
Dim intx, inty, intflag As Boolean
Dim surf1, surf2 As String
Dim k, n, ntype As Integer
Dim xp, yp, zp, x0, y0, z0, r, gx, gy, gz As Double
Dim s1, tol1, tol2, tol3, temp, enxtemp, enytemp, enztemp, xitemp, yitemp, zitemp As Double
Dim temp1, temp2 As Double
intmousewaferflag=False
temp=10^10
temp1=10^9
temp2=10^8
tol1=0.0001'window of intersection tolerance
tol2=0.00001'eliminate starting point self intersection
tol3=0.001'nearness limit to decide if next surface is in contact
surfacemousewafer=" "
surf1=" "
surf2=" "
'straight parts of wafers
For i=1 To NumberStructures
  For j=1 To 10
    If UseStructure(i, j)=True Then 'need to keep this loop here when all wafers compared.
      For n=1 To (NumberLast(i, j)-1)
        'If n>12000 Then
        ' Beep
        ' MsgBox ("n>12000")
        'End If
        If MType(i, j, n)< >"E" Then 'note, this means we do not intersect a segment starting at an E going to the next point.
          xp=XM(i, j, n)
          yp=YM(i, j, n)
          zp=0#
          s1=Sqr((XM(i, j, n)-XM(i, j, (n+1)))^2+(YM(i, j, n)-YM(i, j, (n+1)))^2)
          If s1=0#Then 'point not line
            GoTo IMW50
          End If
          eny=(XM(i, j, n)-XM(i, j, (n+1)))/s1
          enx=-(YM(i, j, n)-YM(i, j, (n+1)))/s1
          enz=0#
          intx=False
          inty=False
          Call intplane(xs, ys, zs, e1x, e1y, e1z, xp, yp, zp, enx, eny, enz, xi, yt, zi, intflag)
          If intflag=True Then
            If xi>=(XM(i, j, n)-tol1) And xi<=(XM(i, j, (n+1))+tol1) Then
              intx=True
            End If
            If xi<=(XM(i, j, n)-tol1) And xi>=(XM(i, j, (n+1))-tol1) Then
              intx=True
            End If
            If yi>=(YM(i, j, n)-tol1) And yi<=(YM(i, j, (n+1))+tol1) Then
              inty=True
            End If
            If yi<YM(i, j, n)+tol1) And yi>=(YM(i, j, (n+1))-tol1) Then
              inty=True
            End If
          End If
          If intx=True And inty=True Then
            s1=Sqr((xi-xs)^2(yi-ys)^2+(zi-zs)^2)
            If s1<(temp+tol3) And s1>tol2 Then 'allow two different surfaces that might be in contact to enter in here
              temp=s1
              temp2=temp1
              temp1=s1
              surf2=surf1
              surf1=MType(i, j, n)
              xitemp=xi
              ytemp=yi
              zitemp=zi
              enxtemp=enx
              enytemp=eny
              enztemp=enz
              surfacemousewafer=MType(i, j, n)
              intmousewaferflag=True
            End If
          End If
        End If
IMW50:
      Next n
    End If
  Next j
Next i
If intmousewaferflag=True Then
  If Abs(Abs(temp1)-Abs(temp2))<tol3 Then
    contact=True
  Else
    contact=False
  End If
  If contact=True Then '?????????????????????????????
    If surf1< >surfaceprevious Then
      surfacemousewafer=surf1
    Else
      surfacemousewafer=surf2
    End If
  End If
  xi=xitemp
  yi=yitemp
  zi=zitemp
  enx=enxtemp
  eny=enytemp
  enz=enztemp
```

```
'If surfaceprevious=surfacemousewafer Then 'if there was
a gap the previous surface is bounded by air
  ' surfacemousewafer="Air"
  'End If
End If
End Sub
The subroutine that is used to trace the Fresnel lenses is:
Sub Intersect_Linear_Fresnel(i, xs, ys, zs, e1x, e1y, e1z, xi,
yi, zi, enx, eny, enz, intfresnelflag)
'i=number of fresnel, xs,ys,zs=starting point of ray, e1x,e1y,
e1z=direction cosines of ray
'xi,yi,zi=intersection point of ray with fresnel, enx,eny,
enz=direction cosine of normal at intersection
'intfresnelflag=true if intersection found.
Dim intflag, intx, inty As Boolean
Dim j As Integer
Dim s1, tol1, smallestdistance As Double
Dim ex, ey, ez, xp, yp, zp As Double
Dim enxsave, enysave, erizsave, xisave, yisave, zisave As
  Double
tol1=0.0001*FresnelLensPitch(i)
smallestdistance=10^10
intfresnelflag=False
'search across fresnel
For j=NLenticulesLeft(i) To NlenticulesRight(i)
    'get slope of facet
    s1=Sqr((X2Fresnel(i, j)−X1Fresnel(i, j))^2+(Y2Fresnel(i,
j)−Y1Fresnel(i, j))^2)
    If s1<>0 Then
    ex=(X2Fresnel(i, j)−X1Fresnel(i, j))/s1
    ey=(Y2Fresnel(i, j)−Y1Fresnel(i, j))/s1
    enx=−ey
    eny=ex
    enz=0#
    xp=X1Fresnel(i,j)
    yp=Y1Fresnel(i, j)
    zp=0#
    Call intplane(xs, ys, zs, e1x, e1y, e1z, xp, yp, zp, enx, eny,
        enz, xi, yi, zi, intflag)
    If intflag=True Then
        intx=False
        inty=False
        If xi>=(X1Fresnel(i, j)−tol1) And xi<X2Fresnel(i, j)
            Then 'check for intersection in facet
            intx=True
        End If
        If xi<=X1Fresnel(i, j) And xi>(X2Fresnel(i, j)−tol1)
            Then
            intx=True
        End If
    If yi>=(Y1Fresnel(i, j)−tol1) And yi<Y2Fresnel(i, j) Then
        inty=True
    End If
    If yi<=Y1Fresnel(i, j) And yi>(Y2Fresnel(i, j)−tol1) Then
        inty=True
    End If
    If intx=True And inty=True Then
        s1=Sqr((xi−xs)^2+(yi−ys)^2+(zi−zs)^2)
        If s1<smallestdistance Then
            smallestdistance=s1
            xisave=xi
            yisave=yi
            zisave=zi
            enxsave=enx
            enysave=eny
            enzsave=enz
            intfresnelflag=True
        End If
    End If
    End If
    End If's1
Next j
xi=xisave
yi=ysave
zi=zisave
enx=enxsave
eny=enysave
enz=enzsave
End Sub
```

We claim:

1. A concentrated solar power system, comprising:
an absorber tube;
a working fluid contained within the absorber tube;
a housing through which the absorber tube extends;
a support plate positioned in the housing above the absorber tube;
a plurality of space-apart, planar optical wafers with a first end supported by the support plate and a second end positioned proximate to an outer surface of the absorber tube; and
a lens array including a plurality of linear Fresnel lenses positioned side-by-side with longitudinal axes in a parallel arrangement, wherein each of the linear Fresnel lenses is spaced apart a lens array height from one of the first ends of the optical wafers and has a focal point proximate to the first end so as to focus received sunlight into the optical wafer associated with the first end,
wherein the second ends of the optical wafers are arranged to be substantially parallel to the longitudinal axis of the absorber tube and are spaced apart about substantially the entire circumference of the absorber tube.

2. The system of claim 1, wherein the optical wafers comprise planar bodies formed of a substantially transparent material, wherein the absorber tube comprises a sidewall formed of material that is at least translucent to light, and wherein the optical wafers are arranged such that a portion of the sunlight focused into the first ends is transferred via total internal reflection to the absorber sidewall.

3. The system of claim 1, further comprising a vertical positioning assembly operating to reposition the lens array to increase or decrease the lens array height, the operation occurring periodically to adjust for seasonal changes in the Sun's position that cause changes in the focal point for the linear Fresnel lenses for the received sunlight.

4. A solar power system for supplying concentrated solar energy, comprising:
a collector; and
a concentrator assembly comprising an array of two or more linear lenses and a set of optical wafers each having a planar body and each being paired with one of the linear lenses, wherein a first edge of the body of the optical wafers is supported in the concentrator assembly to be proximate to the array of linear lenses, wherein a second edge of the body of the optical wafers opposite the first edge is positioned proximate to the collector, and wherein each of the linear lenses focuses received sunlight onto the first edge of the paired one of the optical wafers, whereby at least a portion of the focused sunlight is transmitted through the optical wafers to the collector via the second edges, wherein the collector comprises an absorber tube with a light-transmissive sidewall through which a volume of working fluid flows during operation of the solar power system, wherein the second edge of each of the bodies of the optical wafer is positioned about a circumference of the sidewall to tar at the portion of the focused sunlight into the working fluid, and wherein the lens array includes at least eight of the linear lenses and the set of optical wafers includes at least eight of the optical wafers and further wherein the second edges of the optical wafers are equidistally spaced about circumference of the sidewall of the absorber tube.

5. The system of claim 4, wherein each of the bodies of the optical wafers is formed from a light transmissive material and wherein the portion of the focused sunlight enters the body at the first edge to be retained using total internal reflection.

6. The system of claim 4, wherein the lens array is spaced apart from the first edges of the bodies of the optical wafers a lens array height and wherein the lens array height is selected based on configuration of the linear lenses such that a focal point for each of the linear lenses is proximate to one of the first edges along a length of the concentrator assembly.

7. The system of claim 6, wherein the lens array is positionable within the concentrator assembly to adjust the lens array height such that the focal points of the linear lenses substantially coincide with one of the first edges of the optical wafers to cause the focused sunlight to enter the optical wafers.

8. The system of claim 7, wherein the concentrator assembly includes an array positioning mechanism providing two-axis tracking of the lens array including tracking a position of the Sun during daytime hours and periodically adjusting the lens array height based on the Sun's azimuth to match a focal length of the linear lenses to the array height.

9. The system of claim 4, wherein each of the linear lenses is a linear Fresnel lens.

10. The system of claim 9, wherein the array of lenses includes at least eight of the linear Fresnel lenses.

11. A solar power system for supplying concentrated solar energy, comprising:
a collector; and
a concentrator assembly comprising an array of two or more linear lenses and a set of optical wafers each having a planar body and each being paired with one of the linear lenses, wherein a first edge of the body of the optical wafers is supported in the concentrator assembly to be proximate to the array of linear lenses, wherein a second edge of the body of the optical wafers opposite the first edge is positioned proximate to the collector, and wherein each of the linear lenses focuses received sunlight onto the first edge of the paired one of the optical wafers, whereby at least a portion of the focused sunlight is transmitted through the optical wafers to the collector via the second edges,
wherein the collector comprises an absorber tube with a light-transmissive sidewall through which a volume of working fluid flows during operation of the solar power system,
wherein the second edge of each of the bodies of the optical wafer is positioned about a circumference of the sidewall to target the portion of the focused sunlight into the working fluid, and wherein the concentrator assembly further comprises a sleeve extend in along the length of the absorber tube and spaced apart a distance from an outer surface of the absorber tube, whereby the sleeve rotates about the absorber tube when the position of the lens array is adjusted to track a position of the Sun.

12. The system of claim 11, wherein each of the bodies of the optical wafers is formed from a light transmissive material and wherein the portion of the focused sunlight enters the body at the first edge to be retained using total internal reflection.

13. The system of claim 11, wherein the lens array is spaced apart from the first edges of the bodies of the optical wafers a lens array height and wherein the lens array height is selected based on configuration of the linear lenses such that a focal point for each of the linear lenses is proximate to one of the first edges along a length of the concentrator assembly.

14. The system of claim 13, wherein the lens array is positionable within the concentrator assembly to adjust the lens array height such that the focal points of the linear lenses substantially coincide with one of the first edges of the optical wafers to cause the focused sunlight to enter the optical wafers.

15. The system of claim 14, wherein the concentrator assembly includes an array positioning mechanism providing two-axis tracking of the lens array including tracking a position of the Sun during daytime hours and periodically adjusting the lens array height based on the Sun's azimuth to match a focal length of the linear lenses to the array height.

16. The system of claim 11, wherein each of the linear lenses is a linear Fresnel lens.

17. The system of claim 16, wherein the array of lenses includes at least eight of the linear Fresnel lenses.

18. A concentrated solar power system, comprising
an absorber tube;
a working fluid contained within the absorber tube;
a housing through which the absorber tube extends;
a support plate positioned in the housing above the absorber tube;
a plurality of space-apart, planar optical wafers with a first end supported by the support plate and a second end positioned proximate to an outer surface of the absorber tube;
a lens array including a plurality of linear Fresnel lenses positioned side-by-side with longitudinal axes in a parallel arrangement, wherein each of the linear Fresnel lenses is spaced apart a lens array height from one of the first ends of the optical wafers and has a focal point proximate to the first end so as to focus received sunlight into the optical wafer associated with the first end;
a vertical positioning assembly operating to reposition the lens array to increase or decrease the lens array height the operation occurring periodically to adjust for seasonal changes in the Sun's position that cause changes in the focal point for the linear Fresnel lenses for the received sunlight; and
a sleeve supporting the second ends of the optical fibers in a spaced apart relationship to an outer surface of the absorber tube, whereby the sleeve and second ends moves relative to the outer surface with movement of the lens array.

* * * * *

UNITED STATES PATENT AND TRADEMARK OFFICE
CERTIFICATE OF CORRECTION

| | | |
|---|---|---|
| PATENT NO. | : 7,946,286 B2 | Page 1 of 1 |
| APPLICATION NO. | : 12/888584 | |
| DATED | : May 24, 2011 | |
| INVENTOR(S) | : Raymond et al. | |

It is certified that error appears in the above-identified patent and that said Letters Patent is hereby corrected as shown below:

Column 21, line 7, claim 4, delete "tar at" and insert therefor --target--.
Column 22, line 2, claim 11, delete "extend in" and insert therefor --extending--.
Column 22, line 52, claim 18, after "height", insert --,--.

Signed and Sealed this
Nineteenth Day of July, 2011

David J. Kappos
*Director of the United States Patent and Trademark Office*